(12) United States Patent
Okuyama et al.

(10) Patent No.: US 11,875,685 B2
(45) Date of Patent: Jan. 16, 2024

(54) CONVOY TRAVEL SYSTEM

(71) Applicants: HINO MOTORS, LTD., Hino (JP); JTEKT CORPORATION, Osaka (JP)

(72) Inventors: Hirokazu Okuyama, Hino (JP); Nobuhiko Kojima, Hino (JP); Naoshi Ichinose, Hino (JP); Hirofumi Yasui, Hino (JP); Tomonari Yamakawa, Hoi-gun (JP); Sadahiro Kawahara, Kashihara (JP); Masayoshi Takeda, Kariya (JP); Syuuichi Yonemura, Kariya (JP)

(73) Assignees: HINO MOTORS, LTD., Hino (JP); JTEKT CORPORATION, Kariya (JP)

( * ) Notice: Subject to any disclaimer, the term of this patent is extended or adjusted under 35 U.S.C. 154(b) by 353 days.

(21) Appl. No.: 17/264,216

(22) PCT Filed: Jul. 12, 2019

(86) PCT No.: PCT/JP2019/027648
§ 371 (c)(1),
(2) Date: Jan. 28, 2021

(87) PCT Pub. No.: WO2020/026761
PCT Pub. Date: Feb. 6, 2020

(65) Prior Publication Data
US 2021/0304618 A1    Sep. 30, 2021

(30) Foreign Application Priority Data

Aug. 2, 2018 (JP) ................................. 2018-145622

(51) Int. Cl.
*G08G 1/00* (2006.01)
*B60W 30/09* (2012.01)
(Continued)

(52) U.S. Cl.
CPC ............... *G08G 1/22* (2013.01); *B60W 30/09* (2013.01); *B60W 30/0956* (2013.01);
(Continued)

(58) Field of Classification Search
CPC ............ G08G 1/22; G08G 1/09; G08G 1/166; B60W 30/09; B60W 30/0956; B60W 30/165; B62D 15/0265
See application file for complete search history.

(56) References Cited

U.S. PATENT DOCUMENTS 5,680,122 A    10/1997 Mio
6,128,559 A    10/2000 Saitou et al.
(Continued)

FOREIGN PATENT DOCUMENTS

CN    107406077 A    11/2017
EP    3 091 520 A1    11/2016
(Continued)

OTHER PUBLICATIONS

Apr. 8, 2022 Extended European Search Report issued in European Application No. 19843182.7.
(Continued)

*Primary Examiner* — Tarek Elarabi
(74) *Attorney, Agent, or Firm* — Oliff PLC

(57) ABSTRACT

A convoy travel system includes a plurality of vehicles and is configured such that the plurality of vehicles form a convoy and travel. The plurality of vehicles include a preceding vehicle and following vehicles configured so as to follow the preceding vehicle by means of automatic driving. The preceding vehicle is equipped with a steering information acquisition unit configured so as to acquire steering information pertaining to steering of the preceding vehicle, and a transmission unit configured so as to transmit the steering information to the following vehicles. The follow- (Continued)

ing vehicles are equipped with a reception unit configured so as to receive the steering information, and an automatic driving control unit configured so as to begin a steering angle control for avoiding a collision with an obstruction when the steering information indicates the execution of emergency steering for avoiding a collision with the obstruction.

8 Claims, 5 Drawing Sheets

(51) Int. Cl.
    *B60W 30/095*     (2012.01)
    *B60W 30/165*     (2020.01)
    *B62D 15/02*     (2006.01)
    *G08G 1/09*     (2006.01)
    *G08G 1/16*     (2006.01)

(52) U.S. Cl.
    CPC ....... *B60W 30/165* (2013.01); *B62D 15/0265* (2013.01); *G08G 1/09* (2013.01); *G08G 1/166* (2013.01)

(56) References Cited

U.S. PATENT DOCUMENTS

| | | | | |
|---|---|---|---|---|
| 9,997,077 | B2 * | 6/2018 | Oshida | G08G 1/205 |
| 10,388,168 | B2 * | 8/2019 | Deragården | G08G 1/22 |
| 2013/0124012 | A1 | 5/2013 | Shida et al. | |
| 2016/0071418 | A1 * | 3/2016 | Oshida | G05D 1/0295 |
| | | | | 701/23 |
| 2017/0011633 | A1 | 1/2017 | Boegel | |
| 2017/0066444 | A1 | 3/2017 | Habu | |
| 2018/0137763 | A1 | 5/2018 | Rden et al. | |

FOREIGN PATENT DOCUMENTS

| | | | |
|---|---|---|---|
| JP | H09-81899 | A | 3/1997 |
| JP | H10-96626 | A | 4/1998 |
| JP | H10-307997 | A | 11/1998 |
| JP | H11-20499 | A | 1/1999 |
| JP | 2000-113400 | A | 4/2000 |
| JP | 2007-196809 | A | 8/2007 |
| JP | 2008074210 | A * | 4/2008 |
| JP | 2009-18623 | A | 1/2009 |
| JP | 2012-030666 | A | 2/2012 |
| WO | 2015/047181 | A1 | 4/2015 |

OTHER PUBLICATIONS

Apr. 18, 2022 Office Action issued in U.S. Appl. No. 17/049,060.
Apr. 8, 2022 Office Action issued in Chinese Patent Application No. 201980049631.3.
Sep. 6, 2022 Office Action issued in U.S. Appl. No. 17/049,060.
Dec. 7, 2021 Office Action issued in U.S. Appl. No. 17/049,604.
Dec. 16, 2021 Partial Supplementary European Search Report issued in European Patent Application No. 19792238.8.
Aug. 6, 2019 International Search Report issued in International Patent Application No. PCT/JP2019/027648.

* cited by examiner

CONVOY TRAVEL SYSTEM

TECHNICAL FIELD

The present disclosure relates to a platooning system.

BACKGROUND ART

Patent Document 1 describes a typical example of a technique for allowing for platooning, in which vehicles form a platoon to travel, through self-driving. In such platooning, mutual communication is executed between the vehicles to keep, for example, the vehicle speed and inter-vehicle distance fixed.

PRIOR ART DOCUMENTS

Patent Documents

Patent Documents 1: Japanese Laid-Open Patent Publication No. 9-81899

SUMMARY OF THE INVENTION

Problems that the Invention is to Solve

Following control is executed for a subsequent vehicle, which follows its lead vehicle, such that the subsequent vehicle traces a path for the lead vehicle. Thus, for example, when the lead vehicle is suddenly steered in an urgent manner in order to avoid the collision with an obstacle, the subsequent vehicle is also suddenly steered.

It is an objective of the present disclosure to provide a platooning system that allows a subsequent vehicle to avoid the collision with an obstacle without executing sudden steering when the lead vehicle is suddenly steered to avoid the collision with the obstacle.

Means for Solving the Problem

An aspect of the present disclosure provides a platooning system including vehicles. The platooning system is configured such that the vehicles form a platoon to travel. The vehicles include a lead vehicle and a subsequent vehicle configured to follow the lead vehicle through self-driving. The lead vehicle includes: a steering information acquisition unit configured to acquire steering information related to steering of the lead vehicle; and a sender configured to send the steering information to the subsequent vehicle. The subsequent vehicle includes: a receiver configured to receive the steering information; and a self-driving controller configured to start control of a steering angle of the subsequent vehicle to avoid collision with an obstacle when the steering information indicates execution of sudden steering to avoid the collision with the obstacle.

MODES FOR CARRYING OUT THE INVENTION

First Embodiment

A platooning system according to a first embodiment will now be described with reference to FIGS. 1 to 6, 7A, and 7B.

Figure 1:
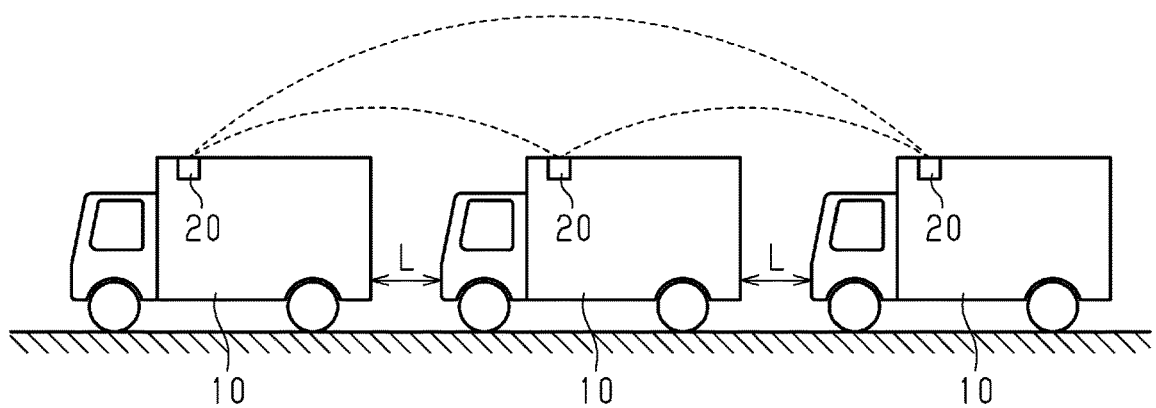
FIG. 1 is a diagram schematically showing the configuration of a platooning system according to a first embodiment.

As shown in FIG. 1, the platooning system includes vehicles 10, each of which includes a vehicle controller 20. The platooning system acknowledges, for example, the vehicle speeds, steering angles, and positional relationship of the vehicles 10 through mutual communication of the vehicle controllers 20 between the vehicles 10. In the platooning system, a subsequent vehicle follows the rear face of its lead vehicle. The lead vehicle is a vehicle 10 that travels right in front of the subsequent vehicle. In the platooning system, the vehicle speed is controlled within a range less than or equal to the maximum speed, and an inter-vehicle distance L is controlled to a proper distance corresponding to the vehicle speed at each moment. Further, in the platooning system, when the lead vehicle is suddenly steered to avoid the collision with an obstacle in an urgent manner, a collision avoidance control is started in the subsequent vehicle to avoid the collision with the obstacle. In the platooning system, the head vehicle 10 may travel through self-driving or may be driven by a driver. The vehicles 10 other than the head vehicle 10 follow their lead vehicles through self-driving. In FIG. 1, the middle vehicle 10 is a subsequent vehicle for the head vehicle 10 and is a lead vehicle for the rearmost vehicle 10.

Figure 2:
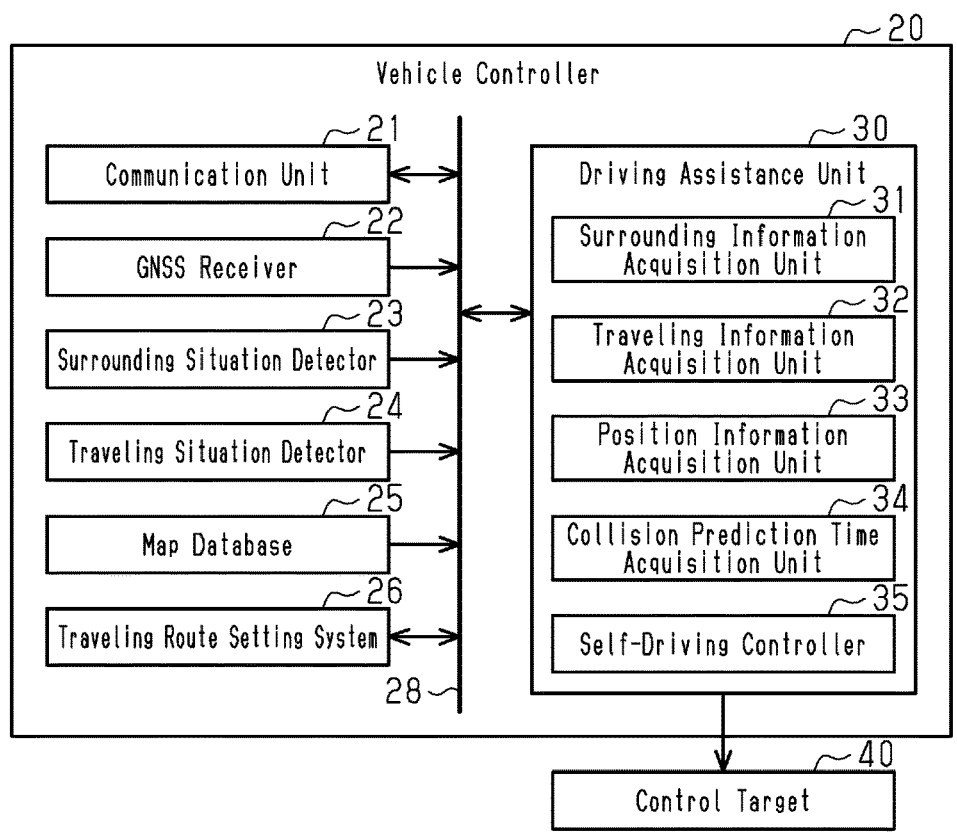
FIG. 2 is a functional block diagram showing the configuration of the vehicle controller in each vehicle in the first embodiment.

Referring to FIG. 2, each of the vehicles 10 includes the vehicle controller 20, which controls the driving of the vehicle. The vehicle controller 20 includes various functional units. Namely, the vehicle controller 20 includes a communication unit 21, a global navigation satellite system (GNSS) receiver 22, a surrounding situation detector 23, a traveling situation detector 24, a map database 25, a travel route setting system 26, and a driving assistance unit 30. These functional units are electrically connected to each other via an onboard network 28. In the following description, for example, "unit X executes operation for the host vehicle" means "unit X executes operation for the vehicle to which unit X belongs." Further, for example, "unit X executes operation for another vehicle" means "unit X executes operation for a vehicle other than the vehicle to which unit X belongs."

The communication unit 21 is capable of mutually executing communication between the vehicles that form a platoon. The communication unit 21 corresponds to a sender that sends, to another vehicle, driving information generated by associating the ID of the host vehicle with various information about the host vehicle that has been output to the onboard network 28. Further, the communication unit 21 corresponds to a receiver that receives the driving information sent by another vehicle. The communication unit 21 outputs, to the onboard network 28, the received driving information of that vehicle. The contents of the driving information will be described later.

The GNSS receiver 22 receives GNSS signals from three or more GNSS satellites (not shown) and acquires GNSS information, which indicates the current location (for example, latitude and longitude) of the host vehicle that is based on the received GNSS signals. The GNSS receiver 22 outputs the GNSS information to the onboard network 28.

The surrounding situation detector 23 includes, for example, a radar unit and an imaging unit to detect the information that indicates the surrounding situation of the host vehicle.

Figure 3:
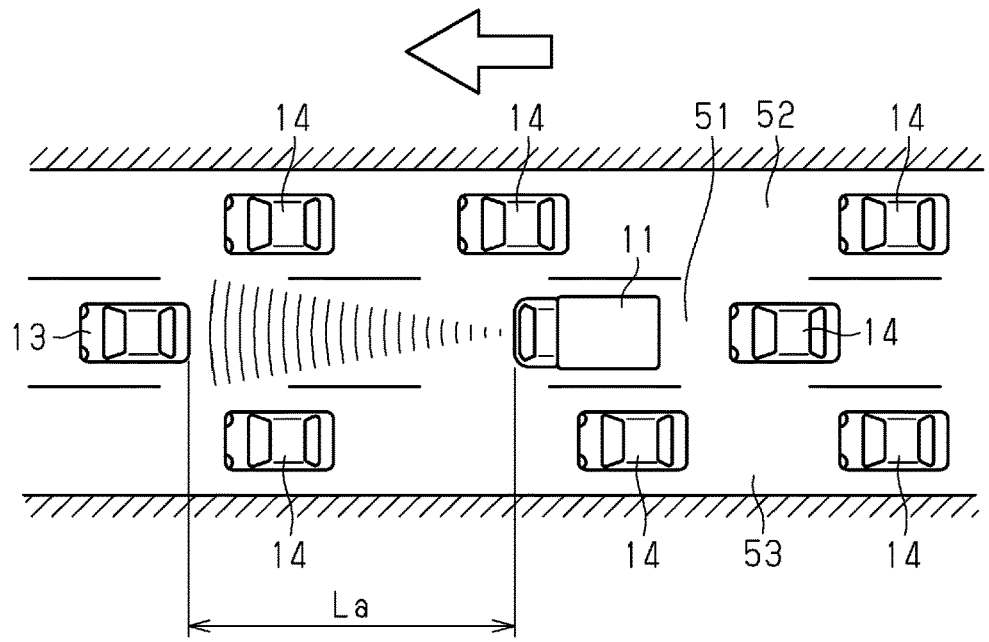
FIG. 3 is a diagram schematically showing a detection range of the surrounding situation detector in the first embodiment.

As shown in FIG. 3, for example, the range of detection by the radar unit is set for the surroundings of a host vehicle 11 so as to detect a front vehicle 13 on a lane 51, where the host vehicle 11 is traveling, and detect surrounding vehicles 14 traveling on lanes 52 and 53, which are adjacent to the lane 51. The radar unit includes, for example, a millimeter wave radar that emits millimeter waves, which are detected waves, to the surroundings of the host vehicle 11 and a laser radar that emits infrared beams, which are detected waves, to the surroundings of the host vehicle 11. The radar unit uses the reflected waves of the emitted detected wave to acquire obstacle information, which indicates the distance from an obstacle located in the surroundings to the host vehicle 11 and the speed relative to the obstacle. The range of imaging by the imaging unit is set for the surroundings of the host vehicle 11 so as to capture the images of the front vehicle 13 and the surrounding vehicle 14. The imaging unit acquires image information, which is obtained by capturing the surroundings of the host vehicle 11. The surrounding situation detector 23 outputs, to the onboard network 28, the obstacle information and the image information, which indicate the surrounding situation of the host vehicle 11.

The traveling situation detector 24 detects various information related to the traveling situation of the host vehicle. The traveling situation detector 24 includes, for example, a vehicle speed sensor that detects a vehicle speed, an acceleration/deceleration sensor that detects an acceleration/deceleration, and a steering angle sensor that detects a steering angle of the steering wheel. The traveling situation detector 24 outputs detection value information, which includes the detection value of each sensor, to the onboard network 28.

The map database 25 has map information, which includes the nodes indicating intersections or branch points and includes a link serving as a road section that connects the nodes to each other. The map database 25 is stored in a storage device installed in the host vehicle. The map information includes, for example, node information, which includes the position, type, and the like of each node. The map information also includes, for example, link information including the number of lanes, curvature, gradient, and the like in addition to the type and length of each link. The map database 25 may be stored in a computer of, for example, a building capable of communicating with a vehicle.

The travel route setting system 26 sets a travel route, where the host vehicle is traveling, and outputs route information, which indicates the set travel route, to the onboard network 28. The travel route setting system 26 is, for example, a navigation system, and includes an operation device operable by the driver and a display device that displays a map based on map information. When, for example, a destination is input via the operation device, the travel route setting system 26 uses the GNSS information output by the GNSS receiver 22 and the map information of the map database 25 to set a travel route from the current location to the destination. The travel route setting system 26 may be provided in, for example, a building capable of communicating with the communication unit 21. In this case, the communication unit 21 receives the route information and outputs it to the onboard network 28. The route information may be shared by platoon-forming vehicles when the route information output by the travel route setting system 26 in a representative vehicle is sent to another vehicle via the communication unit 21.

The driving assistance unit 30 acquires various information output by the onboard network 28. The driving assistance unit 30 then executes various processes using the acquired various information with the programs stored in a memory and various types of data. The driving assistance unit 30 may be circuitry including one or more dedicated hardware circuits such as an ASIC, one or more processors that operate according to a computer program (software), or a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

The driving assistance unit 30 includes acquisition units that acquire various information related to the host vehicle. Namely, the driving assistance unit 30 includes a surrounding information acquisition unit 31, a traveling information acquisition unit 32, a position information acquisition unit 33, and a collision prediction time acquisition unit 34. The driving assistance unit 30 includes a self-driving controller 35, which controls a control target 40 using the information acquired by the acquisition units 31 to 34 so that the host vehicle travels through self-driving.

The surrounding information acquisition unit 31 acquires the surrounding information of the host vehicle using the obstacle information and image information that have been output by the surrounding situation detector 23. The surrounding information acquisition unit 31 acquires the surrounding information, for example, by identifying an object in the image information through the execution of a predetermined identification process for the image information and by associating the identified object with the obstacle in the obstacle information.

For example, when the front vehicle 13 is located relative to the host vehicle 11 as shown in FIG. 3, the surrounding information includes information related to the front vehicle 13. The surrounding information includes, for example, an inter-vehicle distance La and the relative speed between the front vehicle 13 and the host vehicle 11. Further, when multiple surrounding vehicles 14 are traveling around the host vehicle 11 (for example, beside or behind the host vehicle 11), the surrounding information includes information related to each of the surrounding vehicles 14. The surrounding information includes, for example, the distance and relative speed between each surrounding vehicle 14 and the host vehicle 11. The surrounding information acquisition unit 31 recognizes, for example, the position of the host lane and road signs through the identification process for the image information and acquires the surrounding information that indicates, for example, the maximum speed in the traveling road and the position of the traveling lane. The surrounding information acquisition unit 31 sends the surrounding information acquired in this manner to another vehicle via the onboard network 28 and the communication unit 21.

The traveling information acquisition unit 32 acquires traveling information, which indicates the traveling situation of the host vehicle. The traveling information acquisition unit 32 executes the identification process for the image information that has been output by the surrounding situation detector 23, thereby acquiring the horizontal position of the host vehicle on the lane where the host vehicle is traveling and acquiring the traveling information that indicates the angle of the host vehicle relative to the direction in which the lane extends. Further, the traveling information acquisition unit 32 uses the detection value information output by the traveling situation detector 24 to the onboard network 28 to acquire the traveling information indicating, for example, the vehicle speed, acceleration/deceleration, and steering angle of the host vehicle. The traveling information acquisition unit 32 sends, to another vehicle via the onboard network 28 and the communication unit 21, the traveling information indicating the horizontal position, relative angle, vehicle speed, acceleration/deceleration, and steering angle of the host vehicle.

The position information acquisition unit 33 acquires position information, which indicates the positions of, for example, the host vehicle and another vehicle. The position information acquisition unit 33 acquires the GNSS information output by the GNSS receiver 22 to the onboard network 28 and the GNSS information of another vehicle received by the communication unit 21. The position information acquisition unit 33 uses the GNSS information of the host vehicle and another vehicle to acquire the position information indicating the position of each of the vehicles in a platoon, indicating at which position the host vehicle is located in the platoon, and the like. The position information acquisition unit 33 sends, to another vehicle via the onboard network 28 and the communication unit 21, the position information indicating the GNSS information of the host vehicle, indicating at which position the host vehicle is located in the platoon, and the like.

The collision prediction time acquisition unit 34 uses the surrounding information acquired by the surrounding information acquisition unit 31 to calculate a collision prediction time TTC, which is the time for the host vehicle to collide with an obstacle located in front of the host vehicle. The collision prediction time acquisition unit 34 sends collision prediction time information, which indicates the calculated collision prediction time TTC, to another vehicle via the onboard network 28 and the communication unit 21.

The self-driving controller 35 realizes self-driving travel by controlling the control target 40 in reference to the above-described surrounding information, traveling information, position information, collision prediction time information, and the like. The self-driving controller 35 is capable of executing, for example, the self-driving travel to the destination in reference to the route information that has been output to the onboard network 28. Further, the self-driving controller 35 is capable of executing, for example, following control to cause a subsequent vehicle to follow its lead vehicle. The following control includes normal following control and collision avoidance control as described later, and means normal following control in a narrow sense. The normal following control is performed for a subsequent vehicle during normal platooning. The normal following control causes the subsequent vehicle to travel such that the subsequent vehicle follows the rear face of the lead vehicle with the inter-vehicle distance kept at a reasonable distance corresponding to the vehicle speed at each moment and traces the path for the lead vehicle.

The control target 40 includes, for example, a driving actuator, a braking actuator, a steering actuator, and a relay that is incorporated in a lighting system. The driving actuator is incorporated in a power train system including, for example, an engine, a motor, and a transmission and controls the output of the power train system. The braking actuator is incorporated in the braking system of the host vehicle to control a braking force produced by the braking system. The steering actuator is incorporated in the steering system of the host vehicle to control the steering angle of steering. The lighting system includes a braking light, a directional indicator, and the like. The relay controls the directional indicator to be switched on or off.

The self-driving controller 35 corresponds to a vehicle speed controller that executes a vehicle speed control by controlling the driving actuator and the braking actuator. For example, the self-driving controller 35 uses the inter-vehicle distance La and the relative speed between the host vehicle and the front vehicle 13 to calculate the acceleration/deceleration that allows the inter-vehicle distance La to become a reasonable distance corresponding to the vehicle speed, and the self-driving controller 35 outputs a control command value that realizes the calculated acceleration/deceleration to the driving actuator and the braking actuator.

The self-driving controller 35 corresponds to a steering angle controller that executes a steering angle control by controlling the steering actuator. In the steering angle control, the self-driving controller 35 controls the steering actuator such that, for example, the horizontal position of the host vehicle becomes the middle of a lane.

Further, for example, when an obstacle suddenly emerges in front of the vehicle and the collision prediction time TTC becomes less than a threshold value TTC1, the self-driving controller 35 executes an urgent avoidance control to avoid the collision with the obstacle through deceleration and sudden steering. The threshold value TTC1 is a collision prediction time (sudden steering necessary time) in which sudden steering needs to be executed in order to avoid the collision with an obstacle. The self-driving controller 35 uses the surrounding information to acknowledge a region where a vehicle can be pulled over in each of the leftward and rightward directions from the current traveling position, and controls the steering angle such that the vehicle travels in the region in the urgent avoidance control and the steering angle changes in a range operable by a general driver. The urgent avoidance control is started when the collision prediction time TTC becomes less than or equal to the threshold value TTC1, and is continued until the host vehicle is pulled over to avoid the collision with an obstacle and then the host vehicle passes by the obstacle.

In the subsequent vehicle, when the self-driving controller 35 uses the driving information of the lead vehicle acquired via the communication unit 21 to recognize that the lead vehicle has been suddenly steered, the self-driving controller 35 starts the collision avoidance control such that the subsequent vehicle follows the lead vehicle while avoiding the collision with an obstacle that resulted in the sudden steering of the lead vehicle. In the collision avoidance control, the self-driving controller 35 causes the host vehicle to travel such that the host vehicle avoids the collision with an obstacle with a smaller change in the steering angle than the lead vehicle.

The self-driving controller 35 controls the relay to execute a light control. In the light control, the self-driving controller 35 controls the relay such that, for example, the directional indicator is switched on in a direction in which the host vehicle is pulled over in the urgent avoidance control and the collision avoidance control.

The self-driving controller 35 sends, to another vehicle via the onboard network 28 and the communication unit 21, control information including, for example, the above-described control command value of the acceleration/deceleration, the control command value of the steering angle, and a movement command for the directional indicator. For example, the driving information includes the various information sent to another vehicle via the onboard network 28 and the communication unit 21, namely, the surrounding information, traveling information, position information, collision prediction time information, and control information.

The vehicles 10, including the vehicle controllers 20, platoon in the following manner. That is, the vehicles 10 share the above-described driving information to acknowledge the positional relationship between the vehicles 10 such that each inter-vehicle distance is kept at a reasonable distance corresponding to the vehicle speed at each moment with the vehicle speed kept at the maximum speed or lower.

The above-described collision avoidance control, with an example in which the urgent avoidance control is executed for a vehicle traveling at the head of a platoon, will now be described with reference to FIGS. 4 to 7.

Figure 4:
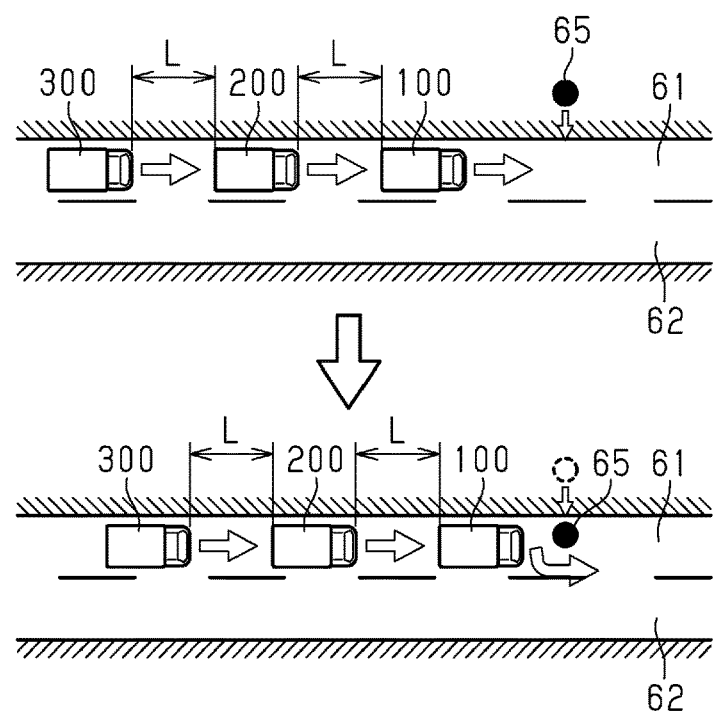
FIG. 4 is a diagram schematically showing an example of a situation where a first vehicle is suddenly steered in the first embodiment.

With reference to FIG. 4, an example of a situation in which the urgent avoidance control is executed for the head vehicle will now be described. As shown in FIG. 4, a first vehicle 100, a second vehicle 200, and a third vehicle 300 are platooning on a four-way road including a left lane 61 and a right lane 62. The first vehicle 100 travels through self-driving at the head of the platoon to a destination using route information, the second vehicle 200 travels through self-driving to follow the first vehicle 100, and the third vehicle 300 travels through self-driving to follow the second vehicle 200. The urgent avoidance control is executed when an obstacle 65 suddenly emerges in front of the first vehicle 100 and the collision prediction time TTC becomes less than or equal to the threshold value TTC1.

The flow of processes executed in each vehicle when the first vehicle 100 executes the urgent avoidance control will now be described with reference to FIGS. 5 and 6.

Figure 5:
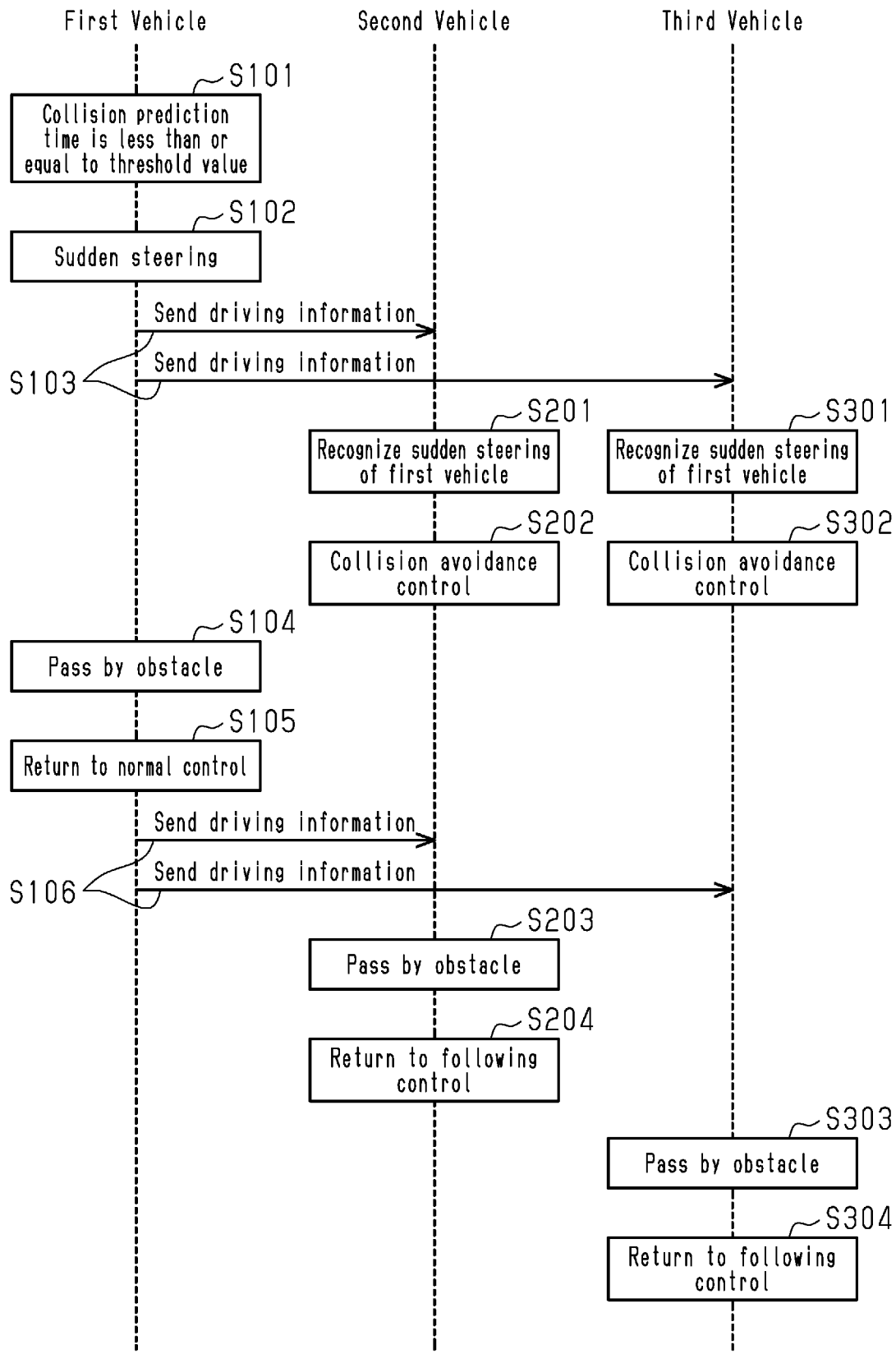
FIG. 5 is a timing diagram illustrating an example of the control mode of each vehicle when the first vehicle is suddenly steered in the first embodiment.

As shown in FIG. 5, the first vehicle 100, the second vehicle 200, and the third vehicle 300 are platooning with the inter-vehicle distance L while sharing the driving information between the vehicles through mutual communication. The self-driving controller 35 of the first vehicle 100 repeatedly determines whether the collision prediction time TTC is less than or equal to the threshold value TTC1. When the collision prediction time TTC is less than or equal to the threshold value TTC1 (step S101), the self-driving controller 35 executes sudden steering accompanied with the urgent avoidance control (step S102). The change in the steering angle during the sudden steering exceeds a range that can be taken when a general driver is normally operating. While executing the urgent avoidance control, the first vehicle 100 consecutively sends, to the second vehicle 200 and the third vehicle 300, the steering information related to the steering of the first vehicle 100 such as the driving information including a detection value of the steering angle and a control command value of the steering angle (step S103).

When the self-driving controller 35 of each of the second vehicle 200 and the third vehicle 300 receives the driving information that has been sent by the first vehicle 100, the self-driving controller 35 determines whether the change in the steering angle exceeds a normal range. When the change in the steering angle exceeds the normal range, the self-driving controller 35 recognizes that the first vehicle 100 has been suddenly steered (steps S201, S301). The self-driving controller 35 may consecutively receive first driving information and second driving information from the first vehicle 100. The change in a steering angle may be a difference between the control command value of a steering angle in the first driving information and the control command value of a steering angle in the second driving information. The change in a steering angle may be a difference between the detection value of a steering angle in the first driving information and the detection value of a steering angle in the second driving information. Alternatively, the change in a steering angle may be a difference in the driving information between the detection value of a steering angle and the control command value of a steering angle. After recognizing sudden steering, each self-driving controller 35 starts the collision avoidance control to follow the lead vehicle while avoiding the collision with the obstacle 65 with a change in the steering angle that is smaller than the steering angle of the first vehicle 100 (steps S202, S302). The above-described normal range, which is possibly taken while a general driver is driving normally, may be a fixed range regardless of the vehicle speed or may become smaller as the vehicle speed increases. When the normal range changes in correspondence with the vehicle speed, the self-driving controller 35 holds normal range data, which defines the normal range corresponding to the vehicle speed, in a predetermined region of a memory. The self-driving controller 35 selects, from the normal range data, the normal range corresponding to the vehicle speed at each moment to determine whether sudden steering has been executed. In such a configuration, the determination about sudden steering is properly executed in correspondence with the vehicle speed at each moment.

Figure 6:
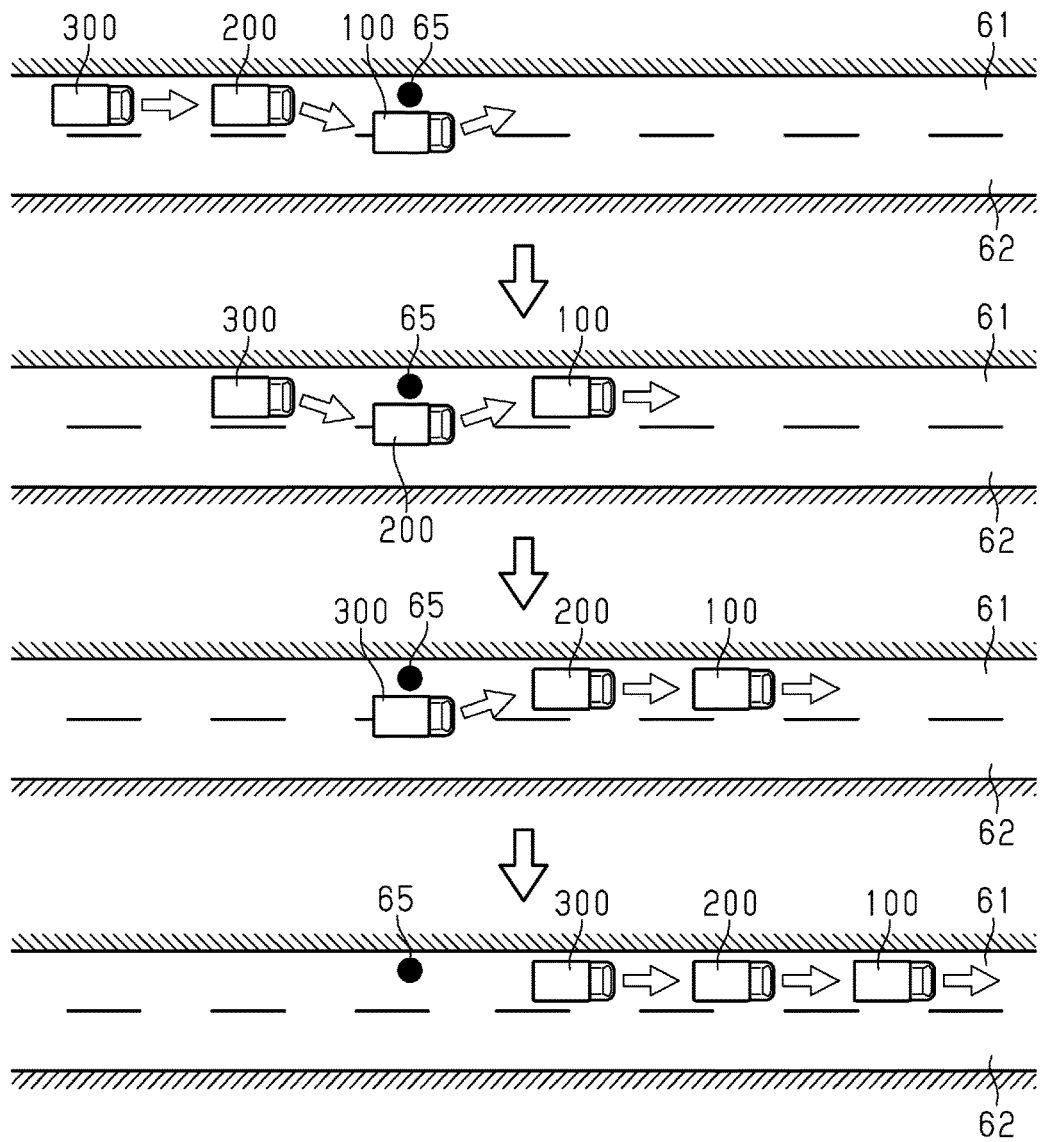
FIG. 6 is a diagram schematically showing an example of how the vehicles avoid the collision with an obstacle in the first embodiment.

As shown in the uppermost section of FIG. 6, in the collision avoidance control in the second vehicle 200 (step S202), the self-driving controller 35 controls the steering angle such that the second vehicle 200 travels toward the first vehicle 100, which is avoiding the collision with the obstacle 65. For example, the self-driving controller 35 sets, as a target position, the position of the first vehicle 100 included in the driving information from the first vehicle 100 and controls the steering angle such that the second vehicle 200 travels toward the target position. In this case, the self-driving controller 35 may maintain the vehicle speed immediately before starting the collision avoidance control. Alternatively, the self-driving controller 35 may maintain the distance between the first vehicle 100 and the second vehicle 200 by gradually reducing the vehicle speed to such an extent that the deceleration does not become excessively large. In the collision avoidance control for the third vehicle 300 (step S302), the self-driving controller 35 causes the third vehicle 300 to follow the second vehicle 200.

When the first vehicle 100 eventually passes by the obstacle 65 (step S104), the self-driving controller 35 of the first vehicle 100 recognizes from the surrounding information of the first vehicle 100 that the first vehicle 100 has passed by the obstacle 65 and returns from the urgent avoidance control to the normal control (step S105). Further, the self-driving controller 35 of the first vehicle 100 sends, to the second vehicle 200 and the third vehicle 300, the driving information including the surrounding information indicating that the first vehicle 100 has passed by the obstacle 65 (step S106). After returning to the normal control, the self-driving controller 35 of the first vehicle 100 controls the steering angle such that the first vehicle 100 returns to the middle position of the left lane 61 as shown by the uppermost section of FIG. 6. Then, the self-driving controller 35 of the first vehicle 100 controls, for example, the vehicle speed and the steering angle such that the first vehicle 100 travels at a predetermined speed on the left lane 61 as shown by the second and subsequent sections of FIG. 6.

In the collision avoidance control, the self-driving controller 35 of the second vehicle 200 refers to the driving information from the first vehicle 100 (step S106) to recognize that the first vehicle 100 has passed by the obstacle 65. Then, the self-driving controller 35 of the second vehicle 200 controls the steering angle by setting, as a final target position of the second vehicle 200, the position of the first vehicle 100 at the point in time where the first vehicle 100 passed by the obstacle 65. The self-driving controller 35 of the second vehicle 200 controls the steering angle such that the second vehicle 200 travels toward the final target position while prioritizing the avoidance of the collision with the obstacle 65. When the second vehicle 200 reaches the final target position and passes by the obstacle 65 (step S204), the self-driving controller 35 of the second vehicle 200 ends the collision avoidance control and returns to the normal following control (step S205). That is, the self-driving controller 35 of the second vehicle 200 controls, for example, the vehicle speed and the steering angle such that the second vehicle 200 follows the first vehicle 100 as shown in the second and subsequent sections of FIG. 6. If the obstacle has been moved, the final target position may be changed in the movement direction of the obstacle 65 based on the surrounding information.

In the collision avoidance control, the self-driving controller 35 of the third vehicle 300 causes the third vehicle 300 to travel so as to follow the second vehicle 200 while prioritizing the avoidance of the collision with the obstacle 65. When the third vehicle 300 passes by the obstacle 65 (step S303), the self-driving controller 35 of the third vehicle 300 ends the collision avoidance control and returns to the normal following control (step S304). That is, the self-driving controller 35 of the third vehicle 300 controls, for example, the vehicle speed and the steering angle such that the third vehicle 300 follows the second vehicle 200 as shown in the third and subsequent sections of FIG. 6.

The platooning system of the first embodiment achieves the following operational advantages.

Figure 7A:
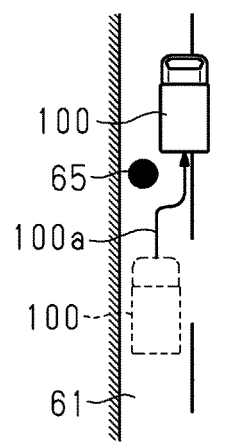
FIG. 7A is a diagram showing an example of the path for the first vehicle avoiding the collision with the obstacle in the first embodiment.
Figure 7B:
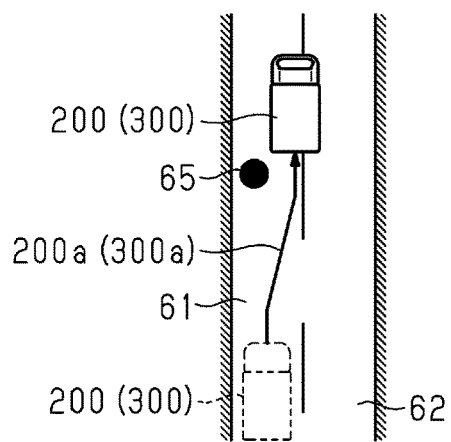
FIG. 7B is a diagram showing an example of the path for the second vehicle and the third vehicle avoiding the collision with the obstacle in the first embodiment.

(1-1) As shown in FIG. 7A, when the collision prediction time TTC becomes less than or equal to the threshold value TTC1, the urgent avoidance control is executed for the first vehicle 100. A path 100a for the first vehicle 100 during the execution of the urgent avoidance control has a shape extending like a crank from the middle position of the left lane 61 toward the side of the obstacle 65. As shown in FIG. 7B, when the second vehicle 200 recognizes that the first vehicle 100 has been suddenly steered, the second vehicle 200 travels toward the first vehicle 100. Thus, a path 200a for the second vehicle 200 has a shape extending straight from the middle position of the left lane 61 toward the side of the obstacle 65. A third path 300a for the third vehicle 300 that follows the second vehicle 200 in the collision avoidance control is the same as the path 200a for the second vehicle 200. That is, when the collision avoidance control is executed for the second vehicle 200 and the third vehicle 300, the second vehicle 200 and the third vehicle 300 start control of the steering angle to avoid the collision with the obstacle 65 at an earlier timing than the first vehicle 100. In other words, the collision prediction time TTC corresponding to the second vehicle 200 when the second vehicle 200 starts executing the urgent avoidance control is greater than the collision prediction time TTC corresponding to the first vehicle 100 when the first vehicle 100 starts executing the urgent avoidance control. In the same manner, the collision prediction time TTC corresponding to the third vehicle 300 when the third vehicle 300 starts executing the urgent avoidance control is greater than the collision prediction time TTC corresponding to the first vehicle 100 when the first vehicle 100 starts executing the urgent avoidance control. This allows the second vehicle 200 and the third vehicle 300 to avoid the collision with the obstacle 65 with a smaller change in the steering angle than the first vehicle 100, that is, without being suddenly steered.

(1-2) The self-driving controller 35 of a subsequent vehicle recognizes that its lead vehicle has been suddenly steered when the change in the steering angle of the lead vehicle deviates from the normal range. That is, the change in the steering angle of the lead vehicle is used to determine that the lead vehicle has been suddenly steered. Such a configuration has smaller errors than, for example, a configuration where the change in the position of the lead vehicle included in the driving information is used to determine that the lead vehicle has been suddenly steered. Such a configuration also allows the self-driving controller 35 of a subsequent vehicle to obtain a reliable result of determination of sudden steering at an early timing.

(1-3) In the collision avoidance control, the self-driving controller 35 of the second vehicle 200 controls the steering angle such that the second vehicle 200 travels toward its lead vehicle that is executing the urgent avoidance control. Such a configuration allows the self-driving controller 35 of the second vehicle 200 to control the steering angle to avoid the collision with the obstacle 65 at the point in time immediately after the first vehicle 100 is suddenly steered, that is, at the point in time before the second vehicle 200 is able to perceive the obstacle 65. This reduces the change in the steering angle of the collision avoidance control and allows the second vehicle 200 to avoid the collision with the obstacle 65 at a stable vehicle position.

(1-4) The self-driving controller 35 of the second vehicle 200 controls the steering angle of the second vehicle 200 by setting, as the target position, the position of the first vehicle 100 that is based on the driving information from the first vehicle 100. This allows the second vehicle 200 to travel highly accurately toward the first vehicle 100 that is avoiding the collision with the obstacle 65.

(1-5) In the collision avoidance control, the self-driving controller 35 of the third vehicle 300 executes the following control such that the third vehicle 300 follows the second vehicle 200. Such a configuration allows the third vehicle 300 as well as the second vehicle 200 to avoid colliding with the obstacle 65 with a smaller change in the steering angle than the first vehicle 100. Additionally, since no substantial change occurs in the series of control for the third vehicle 300, such an operational advantage is gained in a simple configuration.

Second Embodiment

Figure 8:
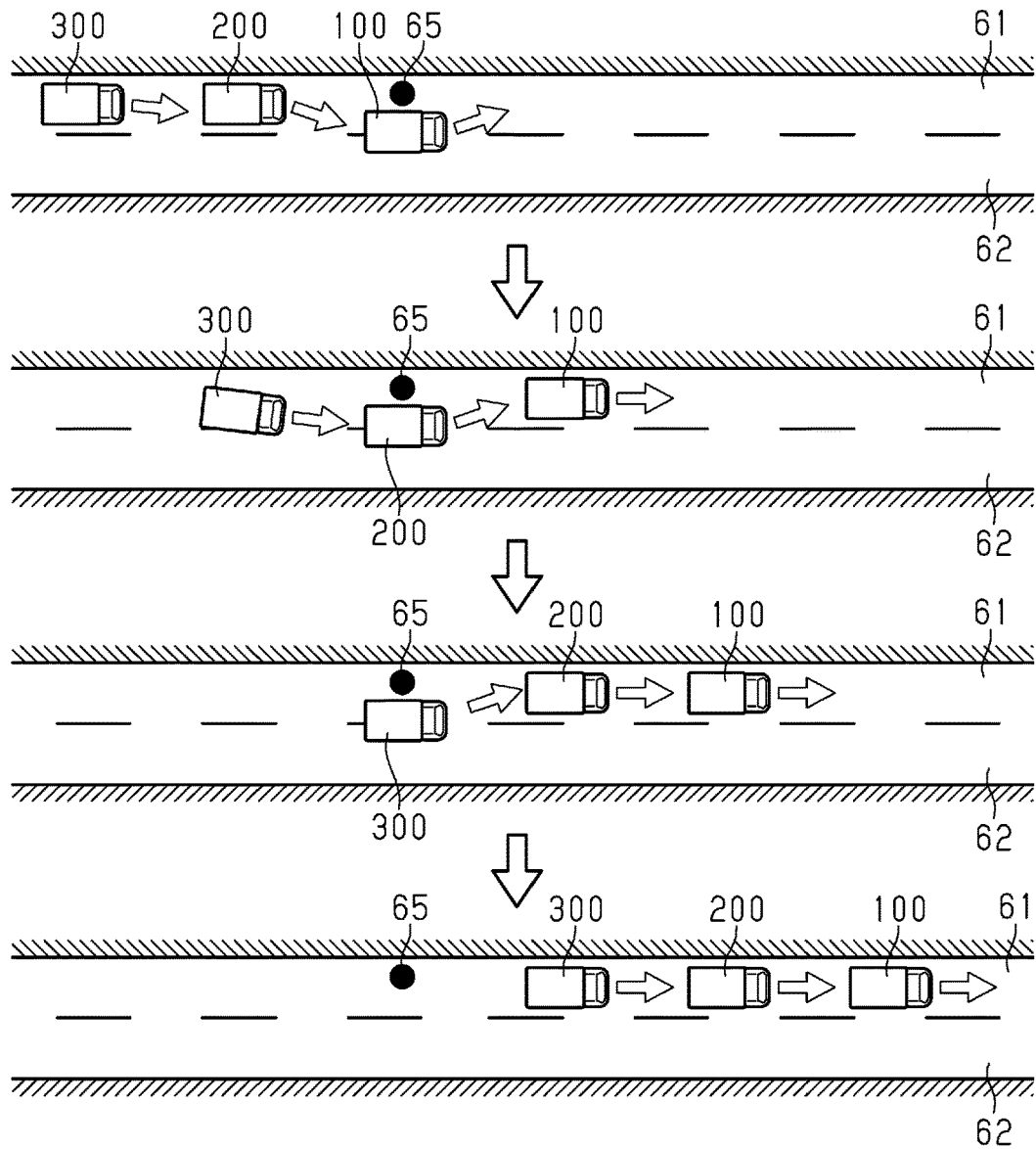
FIG. 8 is a diagram schematically showing an example of how the vehicles avoid the collision with the obstacle in the second embodiment.

A platooning system according to a second embodiment will now be described with reference to FIGS. 8 and 9. The platooning system of the second embodiment differs from the platooning system of the first embodiment only in the collision avoidance control for the third vehicle 300. The platooning system of the second embodiment is the same as the platooning system of the first embodiment in the main components. Thus, in the second embodiment, the differences from the first embodiment will be described in detail. Like or the same reference numerals are given to those components that are like or the same as the corresponding components of the first embodiment.

In the platooning system of the first embodiment, the self-driving controller 35 of the third vehicle 300 executes a control such that the third vehicle 300 follows the second vehicle 200 in the collision avoidance control. In the platooning system of the second embodiment, as shown in FIG. 8, the self-driving controller 35 of the third vehicle 300 controls the steering angle such that the third vehicle 300 travels toward the first vehicle 100 that is avoiding the collision with the obstacle 65. For example, the self-driving controller 35 of the third vehicle 300 uses the received driving information of the first vehicle 100 to set, as a target position, the position of the first vehicle 100 that is executing the urgent avoidance control, and controls the steering angle such that the third vehicle 300 travels toward the target position. That is, the steering angle of the third vehicle 300 changes such that the third vehicle 300 avoids colliding with the obstacle 65 immediately after the first vehicle 100 is suddenly steered, and the steering angle of the third vehicle 300 is controlled by setting, as the final target position of the host vehicle, the position of the first vehicle 100 that has passed by the obstacle 65.

The platooning system of the second embodiment achieves the following operational advantage.

Figure 9:
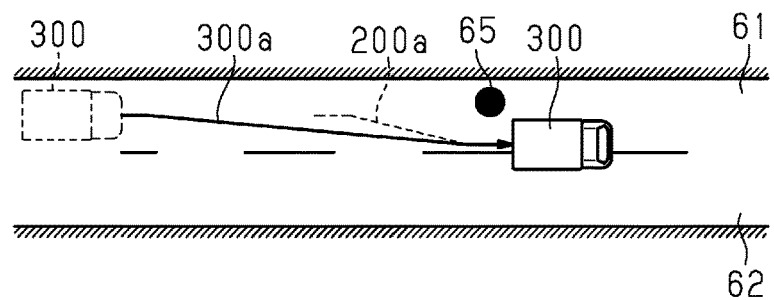
FIG. 9 is a diagram showing an example of the path for the third vehicle avoiding collision with the obstacle in the second embodiment.

(2-1) As shown in FIG. 9, the third vehicle 300 starts a control of the steering angle to avoid colliding with the obstacle 65 at an earlier timing than the second vehicle 200. In other words, the collision prediction time TTC corresponding to the third vehicle 300 when the third vehicle 300 starts executing the urgent avoidance control is greater than the collision prediction time TTC corresponding to the second vehicle 200 when the second vehicle 200 starts executing the urgent avoidance control. Thus, the path 300*a* for the third vehicle 300 has a gentler inclination than the path 200*a* for the second vehicle 200. This allows the third vehicle 300 to avoid colliding with the obstacle 65 with a smaller change in the steering angle than the first vehicle 100 and the second vehicle 200.

The above-described first and second embodiments may be modified as follows. The first embodiment, the second embodiment, and the following modifications can be combined as long as the combined modifications remain technically consistent with each other.

In the first and second embodiments, in the collision avoidance control, the self-driving controller 35 controls the steering angle such that the host vehicle travels toward its lead vehicle avoiding the collision with the obstacle 65. In detail, the self-driving controller 35 controls the steering angle by setting the position of the first vehicle 100 as the target position of the host vehicle. However, controlling the steering angle by setting the position of the first vehicle 100 as the target position of the host vehicle is merely an example. The self-driving controller 35 may control the steering angle using, for example, the surrounding information acquired from the information of an image in which the front of the vehicle is captured, that is, the position of the lead vehicle in a front region of the host vehicle. In this case, the self-driving controller 35 controls the steering angle such that the position of the lead vehicle in the image information is located at the middle portion.

In the collision avoidance control, the self-driving controller 35 does not have to control the steering angle such that the host vehicle travels toward its lead vehicle avoiding the collision with the obstacle 65. The self-driving controller 35 may execute the control using, for example, a fixed set value defined for a change in the steering angle in the collision avoidance control. Such a set value may be selected in correspondence with the vehicle speed at each moment. In this case, the self-driving controller 35 holds steering angle setting data, which defines the set value corresponding to the vehicle speed, in a predetermined region of a memory, and executes the collision avoidance control with the set value selected from the steering angle setting data in correspondence with the vehicle speed at each moment.

In the collision avoidance control, the steering angle of a subsequent vehicle possibly changes in a case where the collision prediction time TTC corresponding to the subsequent vehicle is greater than the collision prediction time TTC corresponding to the lead vehicle when the lead vehicle is suddenly steered. When recognizing that the lead vehicle has been suddenly steered, the self-driving controller 35 of the subsequent vehicle executes the collision avoidance control. For example, the self-driving controller 35 of the subsequent vehicle calculates the collision prediction time TTC for the obstacle 65 using the collision prediction time TTC of the lead vehicle, the vehicle speed of the subsequent vehicle, and the distance between the subsequent vehicle and the lead vehicle, and starts determining whether the calculated collision prediction time TTC is less than or equal to a control start value. The self-driving controller 35 may change the steering angle on condition that the collision prediction time TTC becomes less than or equal to the control start value. The control start value may be defined in advance or may increase as the vehicle speed at each moment increases.

The steering information is not limited to a value that directly relates to the steering angle of the host vehicle, such as a detection value of the steering angle and a control command value of the steering angle. Instead, the steering information may be, for example, the position of a vehicle. In other words, the position information acquisition unit 33 as well as the traveling information acquisition unit 32 and the self-driving controller 35 may correspond to a steering information acquisition unit. In such a configuration, the self-driving controller 35 of a subsequent vehicle may determine whether sudden steering has been executed using a change in the position of its lead vehicle.

When sudden steering is urgently executed, the collision prediction time TTC changes sharply. Thus, the steering information may be, for example, the collision prediction time TTC. In other words, the collision prediction time acquisition unit 34 may correspond to the steering information acquisition unit. In such a configuration, the self-driving controller 35 of a subsequent vehicle may determine whether sudden steering has been executed using a change in the collision prediction time TTC of its lead vehicle.

The self-driving controller 35 of a subsequent vehicle may determine whether its lead vehicle has been suddenly steered, by selectively using the information included in the driving information that has been sent by the lead vehicle.

The self-driving controller 35 of a subsequent vehicle may determine whether its lead vehicle has been suddenly steered, for example, using the collision prediction time TTC in addition to a detection value of the steering angle and a control command value of the steering angle. More specifically, the self-driving controller 35 may recognize that the lead vehicle has been suddenly steered on condition that the change in the steering angle exceeds the normal range and the collision prediction time TTC of the lead vehicle is shorter than the threshold value TTC1, which is the collision prediction time in which the sudden steering needs to be executed in order to avoid the collision with an obstacle.

Alternatively, the self-driving controller 35 of a subsequent vehicle may determine whether the lead vehicle has been steered, for example, using a change in the position of the lead vehicle and using the collision prediction time TTC. More specifically, the self-driving controller 35 may recognize that the lead vehicle has been suddenly steered on condition that the position of the lead vehicle abruptly changes in the horizontal direction and the collision prediction time TTC of the lead vehicle is shorter than the threshold value TTC1.

In such a configuration, for example, even if the lead vehicle is driven by a driver and the driver suddenly steers the lead vehicle without the purpose of avoiding the collision with an obstacle, the sudden steering is prevented from being recognized in the subsequent vehicle as sudden steering to avoid the collision with the obstacle. That is, such a configuration increases the possibility of the subsequent vehicle avoiding misrecognition of sudden steering, and thus further increases the reliability of the result of determining whether the lead vehicle has been suddenly steered.

The execution of sudden steering of the lead vehicle may be predicted from a change in the collision prediction time TTC for the lead vehicle, that is, from how the lead vehicle approaches an obstacle. When the execution of sudden steering of the lead vehicle is predicted, the self-driving controller 35 of the subsequent vehicle may decelerate the subsequent vehicle in advance as part of the collision avoidance control to start control that increases the distance from the lead vehicle. Here, a deceleration start time TTC2 (second threshold value) is set to be less than TTC1 (first threshold value). For example, when the collision prediction time TTC of the lead vehicle is less than or equal to the deceleration start time TTC2 and the collision prediction time TTC is decreased, the obstacle is highly likely to approach the lead vehicle. When the collision prediction time TTC of the lead vehicle is less than or equal to the deceleration start time TTC2 and the collision prediction time TTC is decreased, the self-driving controller 35 may increase the distance between the subsequent vehicle and the lead vehicle. Alternatively, for example, when the decrease rate of the collision prediction time TTC is greater than a normal decrease rate, the self-driving controller 35 may increase the distance between the subsequent vehicle and the lead vehicle. In this case, the self-driving controller 35 may increase the inter-vehicle distance by an amount corresponding to the vehicle speed at each moment or increase the inter-vehicle distance as the change in the collision prediction time TTC becomes larger. In addition, the deceleration start time TTC2 may be a fixed value regardless of the vehicle speed or may be a value that increases as the vehicle speed increases. The normal decrease rate may be a fixed value or may be a value that decreases as the vehicle speed of the host vehicle increases. When the collision prediction time TTC of the subsequent vehicle after the deceleration starts reaches an avoidance start time TTC3, which is greater than the threshold value TTC1, the subsequent vehicle starts to be steered to avoid the collision with the obstacle. In such a configuration, the inter-vehicle distance increases when the execution of sudden steering is predicted in the lead vehicle. This allows the subsequent vehicle to avoid colliding, through gentler steering, with the obstacle with which the lead vehicle avoided colliding with through sudden steering.

The platooning system simply needs to include multiple vehicles 10, and may include two vehicles or may include four or more vehicles.

The invention claimed is:

1. A platooning system comprising vehicles, the platooning system being configured such that the vehicles form a platoon to travel, the vehicles including a lead vehicle and a subsequent vehicle configured to follow the lead vehicle through self-driving, wherein
the lead vehicle includes:
circuitry including a steering information acquisition unit configured to acquire steering information related to steering of the lead vehicle, the steering information indicating a steering angle of the lead vehicle; and
a sender configured to send the steering information to the subsequent vehicle, the steering information indicating that the steering angle has been acquired by the steering information acquisition unit, and
the subsequent vehicle includes:
a receiver configured to receive the steering information; and
circuitry including a self-driving controller configured to start control of a steering angle to avoid a collision with an obstacle when the steering information indicates execution of sudden steering to avoid the collision with the obstacle,
wherein the self-driving controller is configured to determine that the lead vehicle has been suddenly steered when a change in the steering angle that is based on the steering information exceeds a predetermined range,
the subsequent vehicle is configured to selectively execute a normal following control to follow the lead vehicle such that the subsequent vehicle travels so as to trace a path for the lead vehicle and a collision avoidance control such that the subsequent vehicle follows the lead vehicle by traveling without tracing the path for the lead vehicle,
the subsequent vehicle is configured to select the collision avoidance control when the steering information indicates the execution of the sudden steering to avoid the collision with the obstacle, and
wherein, in the case of executing the collision avoidance control, the subsequent vehicle travels from its position toward the lead vehicle such that a path for the subsequent vehicle has a shape extending straight from its position toward a side of the obstacle.

2. The platooning system according to claim 1, wherein
the steering information indicates a collision prediction time for the lead vehicle to collide with the obstacle located in front of the lead vehicle,
in the lead vehicle, the steering information acquisition unit is configured to calculate the collision prediction time, and the sender is configured to send, to the subsequent vehicle, the steering information that indicates the collision prediction time calculated by the steering information acquisition unit, and in the subsequent vehicle, the self-driving controller is configured to determine that the lead vehicle has been suddenly steered when the collision prediction time that is based on the steering information is less than a threshold value.

3. The platooning system according to claim 1, wherein the self-driving controller is configured to control the steering angle such that the subsequent vehicle travels toward the lead vehicle avoiding the collision with the obstacle.

4. The platooning system according to claim 3, wherein the circuitry of the lead vehicle includes a position information acquisition unit configured to acquire position information indicating a position of the lead vehicle, the circuitry of the subsequent vehicle includes a position information acquisition unit configured to acquire position information indicating a position of the subsequent vehicle, in the lead vehicle, the sender is configured to send, to the subsequent vehicle, the position information that indicates the position of the lead vehicle and has been acquired by the position information acquisition unit, and in the subsequent vehicle, the self-driving controller is configured to set, as a target position, the position of the lead vehicle that is based on the position information received by the receiver and control the steering angle such that the subsequent vehicle travels toward the target position.

5. The platooning system according to claim 1, wherein the steering information indicates a collision prediction time for the lead vehicle to collide with the obstacle located in front of the lead vehicle, in the lead vehicle, the steering information acquisition unit is configured to calculate the collision prediction time, and the sender is configured to send the steering information that indicates the collision prediction time calculated by the steering information acquisition unit, and in the subsequent vehicle, the self-driving controller is configured to increase an inter-vehicle distance between the subsequent vehicle and the lead vehicle when the execution of the sudden steering of the lead vehicle is predicted using a change in the collision prediction time.

6. The platooning system according to claim 1, wherein the platooning system includes a first vehicle, a second vehicle, and a third vehicle, the first vehicle is a lead vehicle for the second vehicle, the second vehicle is a subsequent vehicle for the first vehicle, the second vehicle is a lead vehicle for the third vehicle, the third vehicle is a subsequent vehicle for the second vehicle, the third vehicle is configured to acquire the steering information of the first vehicle, and circuitry of the third vehicle includes a self-driving controller configured to control a steering angle such that the third vehicle follows the second vehicle when the first vehicle is suddenly steered.

7. The platooning system according to claim 1, wherein the platooning system includes a first vehicle, a second vehicle, and a third vehicle, the first vehicle is a lead vehicle for the second vehicle, the second vehicle is a subsequent vehicle for the first vehicle, the second vehicle is a lead vehicle for the third vehicle, the third vehicle is a subsequent vehicle for the second vehicle, the third vehicle is configured to acquire the steering information of the first vehicle, and circuitry of the third vehicle includes a self-driving controller configured to control a steering angle such that the third vehicle travels toward the first vehicle when the first vehicle is suddenly steered.

8. The platooning system according to claim 1, wherein when the execution of sudden steering occurs, the lead vehicle changes the steering angle of the lead vehicle by a first amount, and the circuitry of the subsequent vehicle changes the steering angle of the subsequent vehicle by a second amount, the second amount being less than the first amount.

* * * * *